United States Patent [19]

Kobayashi et al.

[11] Patent Number: 4,974,238

[45] Date of Patent: Nov. 27, 1990

[54] COUNTER ARRANGEMENT FOR DETERMINING THE LIFE OF CONSUMABLES IN OFFICE EQUIPMENT

[75] Inventors: Shigetaka Kobayashi, Isehara; Yuuichi Shibata, Yamato; Shuuhei Tanaka, Fujisawa, all of Japan

[73] Assignee: International Business Machines Corporation, Armonk, N.Y.

[21] Appl. No.: 295,327

[22] Filed: Jan. 10, 1989

[30] Foreign Application Priority Data

Jan. 11, 1988 [JP] Japan .................................. 63-2663

[51] Int. Cl.[5] ...................... G06M 1/27; G06K 11/00; G06F 11/30

[52] U.S. Cl. ........................................ 377/16; 377/13; 377/20; 377/26; 377/15; 364/551.01

[58] Field of Search .................. 377/6, 15, 13, 16, 19, 377/20, 26; 364/550, 551.01

[56] References Cited

U.S. PATENT DOCUMENTS

| | | | |
|---|---|---|---|
| 4,389,709 | 6/1983 | Knibiehler et al. | 377/15 |
| 4,441,197 | 4/1984 | Baun et al. | 377/15 |
| 4,531,826 | 7/1985 | Stouchton et al. | 377/16 |
| 4,639,876 | 1/1987 | Deeds | 377/15 |
| 4,719,587 | 1/1988 | Berte | 364/551.01 |
| 4,737,910 | 4/1988 | Kimbrow | 377/13 |
| 4,852,104 | 7/1989 | Finger | 377/16 |

*Primary Examiner*—John S. Heyman
*Attorney, Agent, or Firm*—Carl M. Wright

[57] ABSTRACT

Equipment using consumables that require replacement after a predetermined number of uses includes counter arrangements for keeping track of the number of uses of each consumable. Even though some of the consumables may replace the same item, the usage count is maintained for each individual consumable. For the consumables, automatic identification of replaced items is provided whereby the counter arrangement is enabled to accumulate usage counts on the correct consumables.

4 Claims, 5 Drawing Sheets

COUNTER ARRANGEMENT FOR DETERMINING THE LIFE OF CONSUMABLES IN OFFICE EQUIPMENT

BACKGROUND OF THE INVENTION

1. Field of the Invention

This invention relates to counters and storage arrangements for maintaining records of usage of consumables in equipment, particularly office equipment.

This invention provides an office machine that does not increase the cost of disposable consumables, that does not require an operator to record the number of uses, and that enables the number of uses or the life of a number of consumables to be controlled.

In addition, according to this invention, because the storage area within the office machine has flexibility, it has the effect of minimally increasing the cost of the office machine itself.

2. Description of Related Art

In the prior art, printers or copying machines utilizing the electrophotostatic copying technique rapidly gained popularity because of features like high speed, high quality, and low noise in operation. It is necessary, however, to replace their consumables such as photosensitive drums and brushes at the end of a predetermined life. The proper determination of the replacement timing and proper maintenance of the consumables leads to good printing quality and extended life of the product. Particularly, these consumables have recently been modularized and can be replaced by the user himself so that the demand for easy determination of the time for exchange is increasing.

Conventionally, a counter dedicated to specific consumables is mounted in the office machine and is reset to start counting from an initial value whenever the related consumables are replaced. Therefore, in a case where a plurality of consumables are alternatively used for applications, the intervention of an operator is required to record the contents of the counters whenever the corresponding consumables are exchanged. The manual intervention, however, leads to a low reliability with respect to the contents of the counters.

On the other hand, there are arrangements in which a counter or count storage area is provided on each of the consumables to be counted. For example, Japanese Published Examined Patent Application No. 61-9149, published on Mar. 20, 1986, discloses a typewriter in which a counter is provided in the typewriter and a magnetic tape is provided in a cartridge case, which contains a type wheel as a consumable, for storing the number of uses of the wheel. In addition, Japanese Published Unexamined Patent Application No. 60-63551 published on Apr. 11, 1985, discloses a counter in a kit containing all or parts of consumables such as a photosensitive drum, a developer, a cleaner, and a charging unit instead of providing a counter on the image forming device body.

Providing a counter or count storage area for each consumable is undesirable because it leads to increased cost of the consumables. In addition, the count stored in the consumables is easily lost and tends to be unreliable in providing data for determining whether the consumables are within the life guaranteed by the manufacturer. This may be solved by providing a number of dedicated counters or count storage areas in the office machine. If there are a plurality of consumables with the same functions which are alternately used, it is difficult to determine how many counters or count storage areas should be provided, and the method is expensive with little possibility of attainment.

Therefore, one object of the invention is to provide an improved office machine for which the number of uses or the life of each disposable replacement part or consumable can be managed without increase of cost or intervention by the operator.

Another object of the invention is to provide an office machine with a new arrangement that minimizes the cost increase of the office machine by providing flexibility for counting of the life of each kind of consumables and storing of the count.

SUMMARY OF THE INVENTION

According to the invention, the above-mentioned problems are solved by providing a plurality of used life count storage areas and storage areas for consumables, which are not dedicated to a particular consumable but for general usage, in a memory in an office machine. An identification number or code, such as the manufacturer's serial number, of the consumable is associated with each used life count so that even consumables with the same function can be identified.

A control means comprising microcode or the like is arranged to control the rewriting of a plurality of identification codes or the used life counts and to access the used life count storage areas so that, when the identification code of a loaded consumable is read or entered, the corresponding used life count is updated according to time or the number of uses of the office machine or the consumables.

Particularly, the control means detects whether the identification code of the loaded consumables is one already stored in the identification code storage area and performs control according to the detected result so that the used life count storage area of any required consumables, whether it is a used or a new one, can be accessed.

DESCRIPTION OF THE PREFERRED EMBODIMENT

Figure 1:
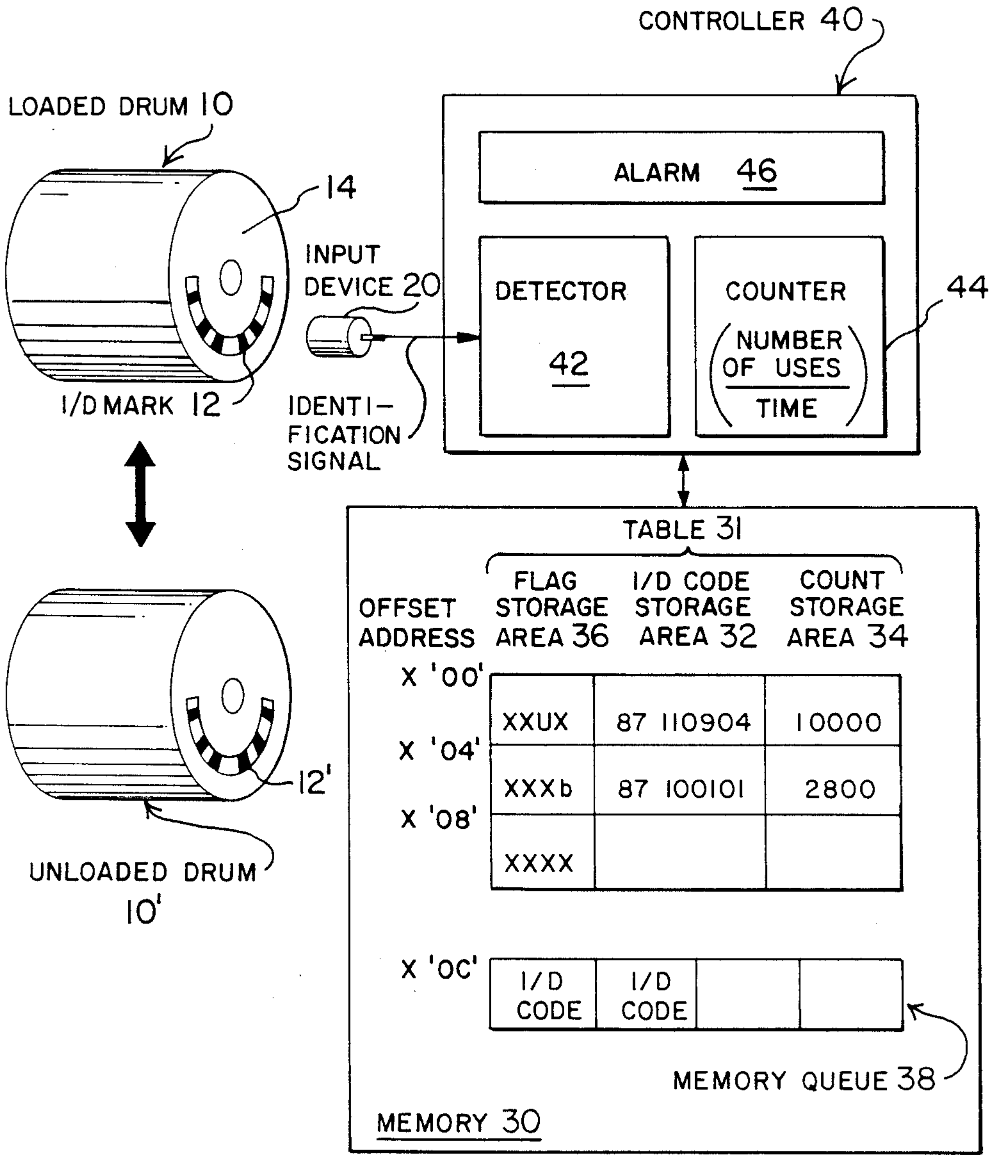
FIG. 1 is a diagram showing an arrangement of the invention.

In FIG. 1, photosensitive drums 10 and 10', which are typical consumables, are provided with different identification marks 12 and 12', respectively. When the identification mark 12 of the drum 10 loaded into the office machine is read and entered by an input device 20, such as a photosensor, a detector 42 checks whether an identification code (I/D code) corresponding to the identification mark 12 exists in an identification code storage area 32 of a memory 30. A controller 40, such as a microprocessor (including the detecting means 42), is arranged in such a manner that, when the entered identification code is detected, it can access a used life count storage area corresponding to the detected identification code. If the drum is a new one, the entered identification code has not been recorded in the identification code storage area 32. Therefore, the controller means 40 is arranged to register or store the entered identification code in the identification code storage area and to be able to access a corresponding used life count storage area. In the embodiment, access is made possible by setting an in-use flag to "1". A counter 44, which may be a part of the controller 40, performs counting to update the count in the accessed used life count storage area corresponding to time or the number of uses of the office machine using the consumables.

The invention is now described with respect to an electrostatic drum that is a typical consumable item for an electrostatic copying machine or printer.

Figure 2:
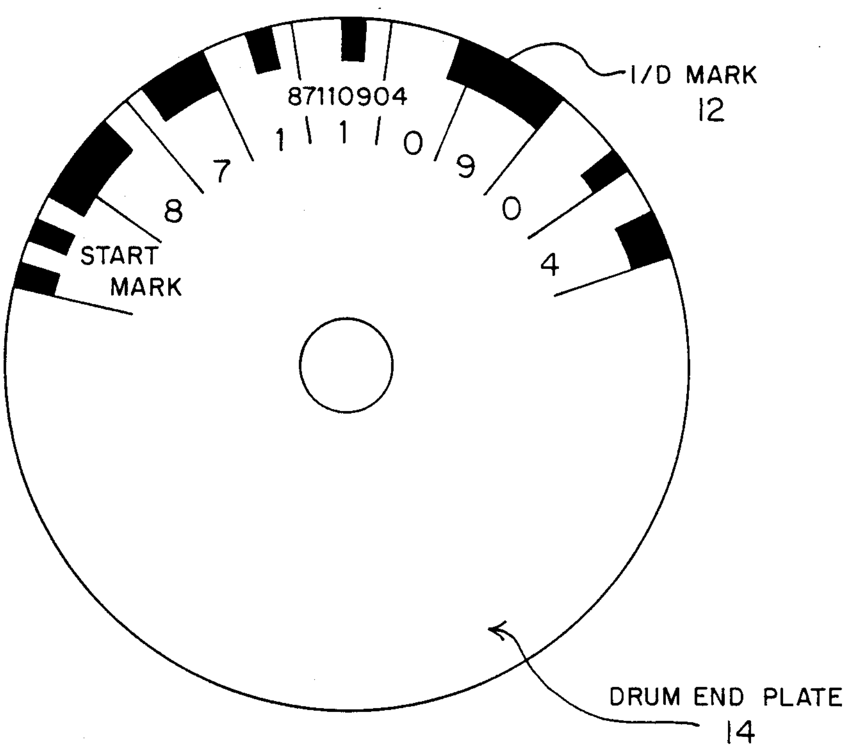
FIG. 2 is a diagram showing an example of the identification mark on a drum.

As shown in FIG. 2, an identification mark 12 is read by an input device 20 (FIG. 1), e.g., an optical sensor or magnetic sensor, which may be of any conventional design. The coding used in the embodiment being described, however, is a bar code, shown in the following Table 1, that indicates the manufacturer's serial number and which is normally provided on each drum.

TABLE 1

Numeral-code relation table

| Numeral | Code |
|---|---|
| 0 | 0001 |
| 1 | 0010 |
| 2 | 0100 |
| 3 | 1000 |
| 4 | 0011 |
| 5 | 0110 |
| 6 | 1100 |
| 7 | 0111 |
| 8 | 1110 |
| 9 | 1111 |
| Start | 10101 |

As shown in FIG. 1, the bar code is located on the circumference of a drum end plate 14 of a drum 10 opposite from the input device 20. It is arranged in such a manner that eight digits, starting with the start mark, can be read by the input means when the drum 10 rotates. The last digit of the eight digits is a check digit, set to a value that makes the sum of the eight digits divisible by ten and is used for read error checking. As seen in Table 1, a code corresponding to each decimal numeral consists of four bits. Each of the bar codes contains one black bar within a digit space so each has a different width in different parts of the digit space. The start mark consists of five bits having a bar code represented by three unit black bars. This start mark enables the input means to recognize one unit width each of black and white bars and to read each numeral corresponding to subsequent bar codes by using the unit read width as a reference. Corresponding numerals are supplied with the bar codes on the end plate 14 of the drum 10 so that the identification number can be checked visually. A read error is checked by reading the bar codes of the manufacturer's serial number three times. Two sets of the bar codes are provided on the circumference so as to reduce the amount of rotation of the drum necessary for reading the bar codes during the initial operation when the power is on. Marks other than bar codes can be used for automatic input. It is also possible for an operator to enter the codes via the control buttons or a keyboard or by using a card or disk.

The detector 42 (FIG. 1) receives and detects the identification code, storing the latter in an identification code storage area 32, part of the Table 31 in the memory 30. Such means are well known in the art. For example, a configuration can sequentially add a predetermined value to offset addresses in the memory 30 for accessing a series of identification codes, reading stored identification codes at the addressed locations, and comparing them with identification codes previously stored to determine a match. If all digits are read and scanned but no match is detected, then the currently entered identification code is stored in an empty space in the table 31 for a subsequent counting operation. Because the embodiment is further provided with a memory queue 38 storing only identification codes for old drums or the like, all drums having identification codes not contained in the table 31 with a count storage area are not necessarily new ones.

Figure 3:
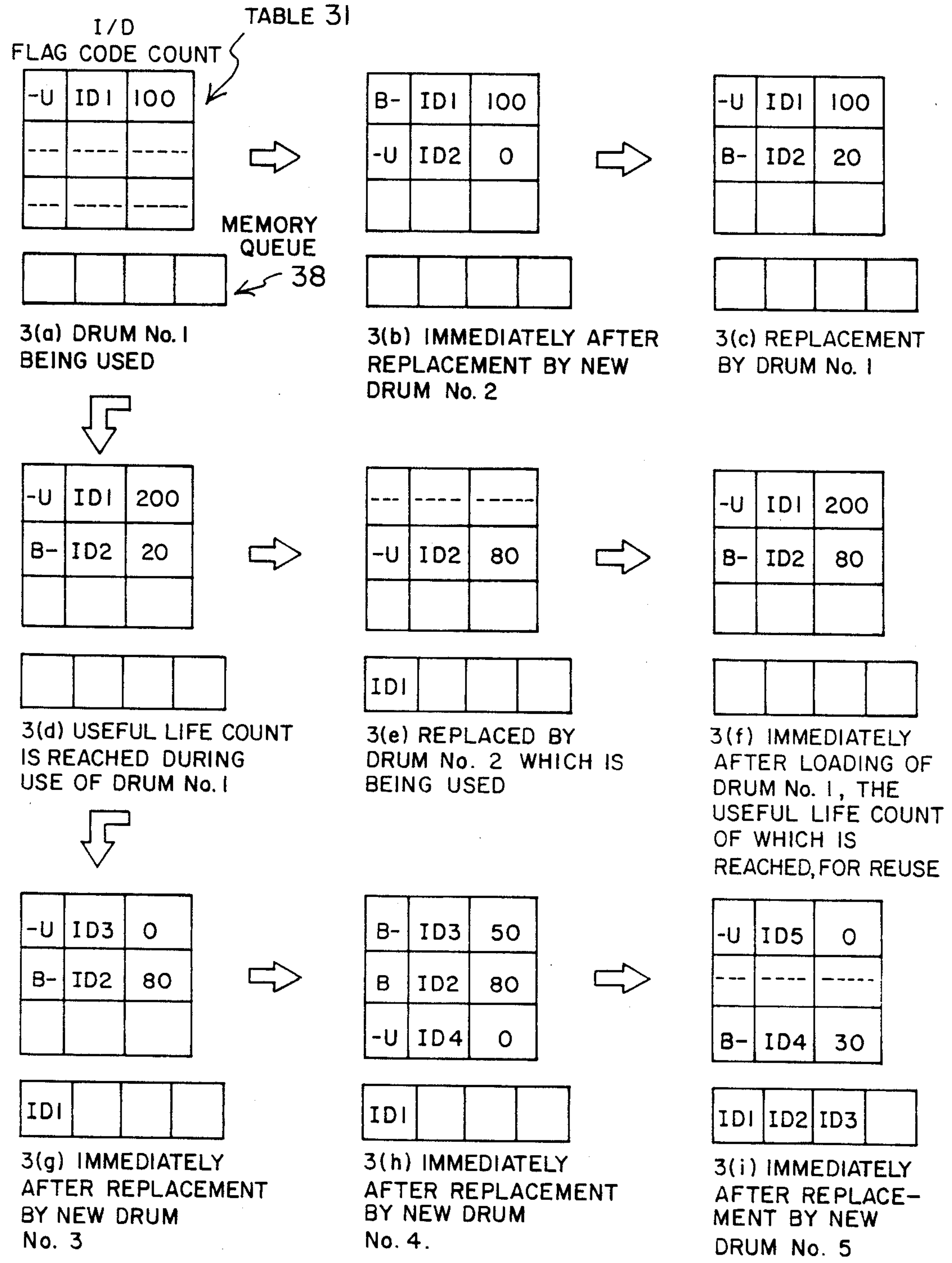
FIG. 3 is a series of illustrative diagrams, FIGS. 3(*a*)-3(*i*), showing use states of the storage area.

In FIG. 3, an example is shown of the organization and use of the memory 30 having the identification code storage area 32 with three used life count storage areas 34 and the memory queue 38 without a used life count storage area (to conserve memory space) having four identification code storage areas used during the operation of a printer.

FIG. 3(*a*) shows a state where the first drum, represented by identification code IDl, has been used one hundred thousand times. In the identification code IDl, the "in-use" flag bit representing that the drum is in use is set to "1", in the figure, represented by "U". If the drum is replaced with a new second drum, the flag bit for the first drum becomes 0, in the figure, represented by -, and instead the backup flag is set to "1", in the figure, represented by B. Then, the identification code ID2 of the second drum is entered and its used life count storage area is reset to 0. The B flag indicates that the entry had been used in the past and distinguishes the storage area from one in use or a new one. The identification code ID2 is set with the in-use flag bit "1". This state is shown in FIG. 3(*b*).

FIG. 3(*c*) shows a state in which the second drum is replaced with the first drum. When a plurality of drums are used successively as described, only the flags are changed, but the used life count is accumulated without resetting even if a drum is removed.

FIG. 3(*d*) shows a state where the used life count for the first drum reaches a predetermined count, its useful life count. "!" indicates that an alarm is displayed and intermittent alarms may be sounded for an operator by an alarm means 46, using a message display or the like. In the embodiment, it may be possible for the operator to reset the alarm means 46 and for the drum that has reached the end of its life to continue to be used for applications where low quality printing is acceptable.

FIG. 3(*e*) shows a state where the first drum is immediately replaced with the second drum and used eighty thousand times. The identification code for the first drum, which has reached its, useful life count, is stored in the memory queue 38. Because the memory queue 38 does not store the used life count so as to conserve memory space, the number of uses of the drum entered in the memory queue 38 is assumed to be two hundred thousand, the useful life count, regardless of the actual number of uses. Counting is resumed from that count when that drum is reused. If the used life count exceeding the useful life count is not necessary, such counting may be suppressed.

Such a state is shown in FIG. 3(*f*). The resetable alarm means 46 is energized to alert the operator when the operation is resumed after power has been shut down.

FIGS. 3(*g*) and 3(*h*) show cases wherein third and fourth drums are replaced and used.

FIG. 3(*i*) shows an example of the process where the quantity of drums exceeds the number of storage areas. Namely, as shown in FIG. 3(*h*), the used life count storage area 34 is insufficient if a fifth new drum is to be used while the second, third and fourth drums are in the state of having been used. In such a case, it is possible to create an empty space in the table 31 by transferring the identification codes ID2 and ID3, for which the backup flag bit is set, to the memory queue 38. Although their used life counts did not reach the useful life counts, the identification codes are transferred to the memory queue 38 and the used life counts are assumed to have been reached because drums with the useful life counts are assumed to be damaged or to have caused problems of print quality, such as fogging, and cannot be used so that the fifth drum was loaded. Alternatively, an approach may be employed in which only those drums having the higher used life counts have their identification codes, with the back up bit, transferred to the memory queue 38. The identification codes of older drums may be transferred using a separately created flag or using the manufacturer's serial number in the order of manufacturing.

In FIG. 3(*h*), if the used life count of the fourth drum ID4 in use reaches the useful life count, ID4 is transferred to the memory queue 38 and the memory space for the used life count is vacant. Therefore, there is no need to transfer the identification codes with the backup flag bit, even though it has not reached its useful life count, to the memory queue 38 even if the drum is replaced with a new one or one that is stored in the memory queue 38.

Figure 4:
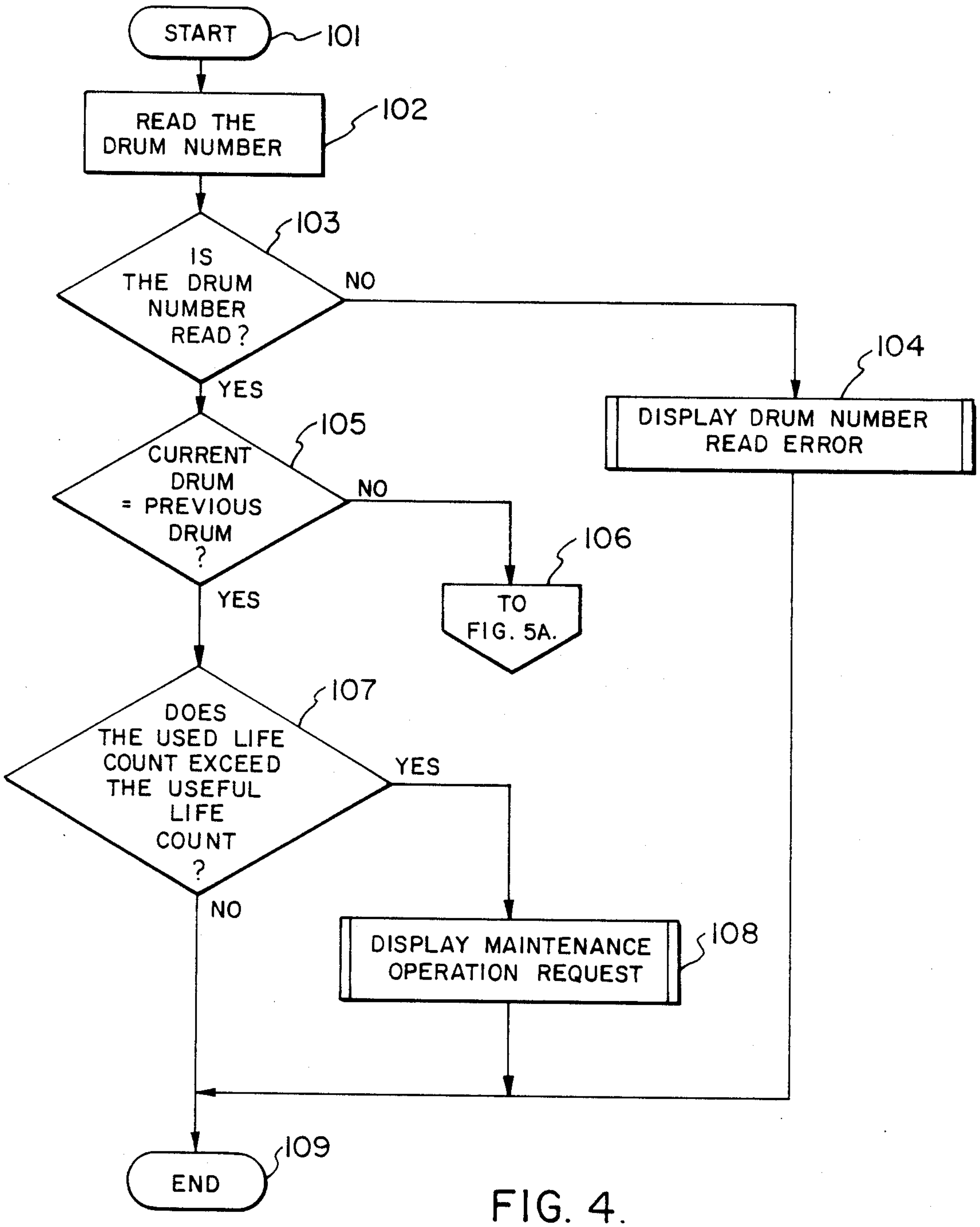
FIGS. 4 and 5 (A and B) are flowcharts showing a control configuration for the storage area.
Figure 5A:
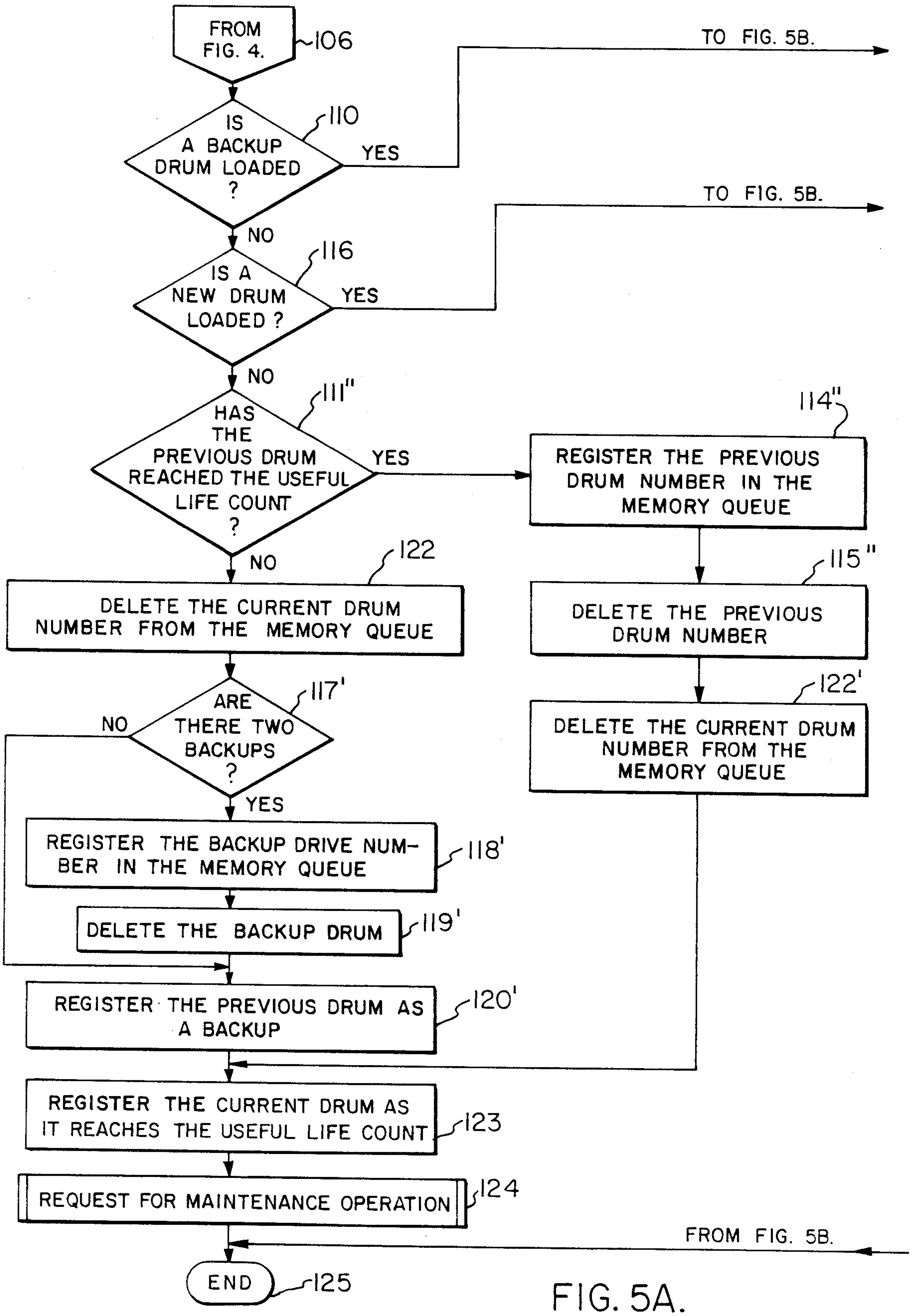
Figure 5B:
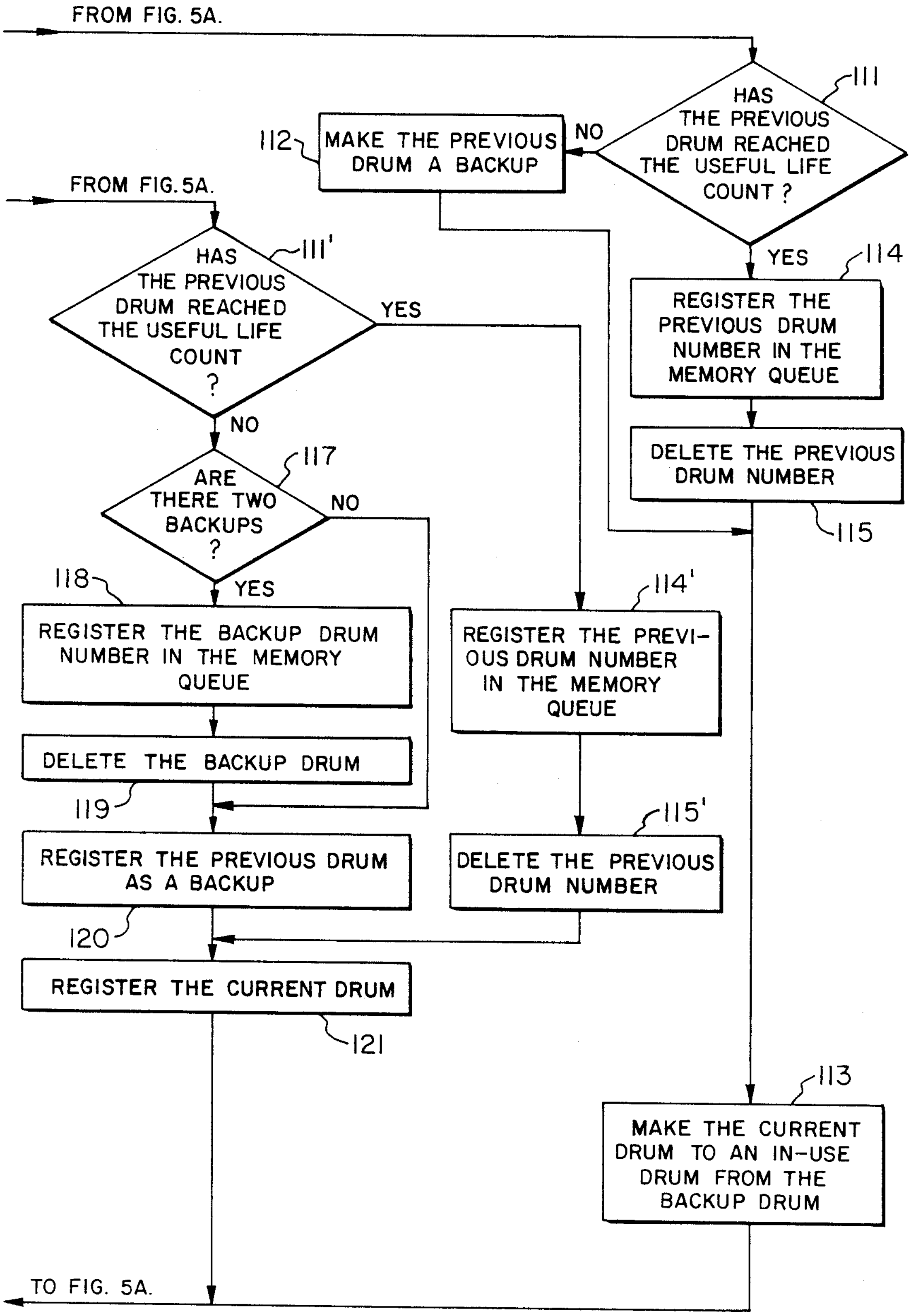

In the flowcharts of FIG. 4 and 5(A) and (B), the logic control operation of the controller 40 of the embodiment being described is set forth. Those skilled in the art of microcoding can prepare a detailed logic control program from these flowcharts.

Initially, when the power of a printer is turned on or when closing a printer cover is detected after replacement of a drum or completion of other maintenance or inspection operations, i.e., when the printer is in a reset state after supplying the power but before starting of the actual printing operation (block 101), the printer controller performs various initial housekeeping operations. The memory 30 of FIG. 1 is desirably a permanent memory, such as a non-volatile memory, so that its contents are not lost when the power is turned off.

The procedure of FIG. 4 describes how to read the drum number and how to determine whether a previous drum is used or if it has been replaced. As shown in the block 102, the printer reads the manufacturer's serial number, which is the identification number of the drum. The reading should be completed by rotating the drum once relative to the identification mark sensor. The reading, however, is made three times to prevent a read error. The reading is considered successful if any two readings match. Otherwise, it is deemed to have failed (block 103). If the reading fails, the process proceeds to the block 104 to display a drum sensor error on an operator panel of the printer and then proceeds to END 109. If the reading is successful, the process proceeds to the block 105 where a check is made to determine whether the drum being used is the previous one. If not, the process proceeds to processing procedure for replacing a drum, shown in FIG. 5A (block 106). If so, the process proceeds to the block 107 where the used life count exceeding predetermined useful life count checked. That is, in the embodiment being described, a check is made to determine whether two hundred thousand uses have been exceeded. If so, the process proceeds to the block 108 where the operator is notified on the operator panel that maintenance is required. In the embodiment being described, however, a drum having a used life count exceeding the predetermined life can be continued to be used if so desired by the operator. To this end, a switch can reset the warning or the alarm (not shown). If the used life count does not exceed the predetermined value, the procedure where the previous drum is the current drum is terminated at the block 109.

The procedure of FIG. 5A and B describe the procedure of the controller 40 when a drum in use is replaced by another drum. This corresponds to use of the non-volatile memory 30 described in connection with FIG. 3.

In the block 105 of FIG. 4, it has been determined that the current drum is not the previous one. In the block 110 of FIG. 5A, a check is made to determine whether the current drum was used before the previous drum but is not yet stored in the memory queue, i.e., whether a backup drum is loaded. If not, then in a block 116, it is determined whether a new drum is loaded. According to the result of these tests (based on the drum identification number), the following procedure for appropriately changing the in-use flag and the backup flag in the flag storage area and transferring the location of the identification code to or from the memory queue 30 is performed by the control means 40.

Whether a backup drum is loaded is determined in the block 110. This is accomplished by scanning the identification code storage areas 32 in the memory 30 and comparing each to the identification code from the input device 20. If a match is found, the flag storage area associated with the code is checked to determine whether the backup flag B is set. If it is found that the backup drum is loaded by finding the backup flag set, the process proceeds to the block 111. In the block 111, it is determined whether the drum previously used has reached its useful life count by checking whether the used life count associated with the previous identification code is greater than two hundred thousand. If the count is less than two hundred thousand, i.e., has not reached the useful life count, the process proceeds to the block 112 where the previous drum is made a backup drum by resetting the in-use flag bit and setting the associated backup flag. Then, this routine exits, via the block 113, by resetting the backup flag B in the flag storage area 36 associated with the identification code for the currently loaded drum and setting the associated in-use flag U to indicate in-use. This corresponds to the operation of FIG. 3(*c*).

In the block 111, if the drum previously used is found to have reached its useful life count, the process proceeds to the block 114 where the identification code of the drum previously used, or the one having its in-use flag set, is stored in the memory queue 38, the table of identification codes for used drums. Then, the process proceeds to the block 115 where the identification code in the table 31 and its associated used life count storage area is deleted. This is to make a space in the table 31 for the used life count storage area. Next, the process proceeds to the block 113 to change the flag for the identification code of the current drum to indicate its in-use state as already described. This corresponds to the operation from FIG. 3(*d*) to 3(*e*).

At the block 110, if the currently loaded drum is not a backup drum, the process proceeds to the block 116 where it is determined whether the currently loaded drum is a new one. That is, it is considered a new drum if an identification code the same as that of the loaded drum is not found after all the identification storage areas 32 and 38 in the memory 30 have been scanned. If a new drum is loaded, the process proceeds to the block 111' where, as in the block 111, it is checked whether the drum previously used has reached its used life cont. If not, the process proceeds to the block 117 corresponding to the operations of FIG. 3(*b*) or 3(*c*). In the block 117, a check is made whether there are two backup drums in order to determine whether there is a space in the table 31 for the identification number of the new drum. If so, the process proceeds to the blocks 118 through 121. This corresponds to the operation in FIG. 3(*b*) to 3(*i*). That is, the identification number of the backup drum is stored in the memory queue 38 according to the block 118, and the identification number of the backup drum is deleted by the block 119. The drum that was used previously is stored as a backup drum by the block 120. The current new drum is stored in an empty space in the table 31 with its associated used life count by the block 121. Then the routine exits at the block 125.

In block 117, if there are not two backup drums, the process transfers directly to the block 120, by skipping the above-mentioned blocks 118 and 119, because there is a space in the table 31 with an associated used life count storage area to store the data for a new drum. If the drum being used has reached its used life count (the YES path of the block 111'), its identification number is transferred to the memory queue 38 by the blocks 114' and 115'. This secures a space into which the identification number of a new drum is stored so that the operations of the blocks 117 through 120 can be skipped.

The block 116, if the process proceeds along the NO path, corresponds to the case where the identification number of the drum currently loaded is detected in the memory queue 38 after taking the result in the block 110 into consideration. In this case, whether the drum, having been used previously has reached its life count is determined in the block 111". If not, the process proceeds to the block 122. The operations from there correspond to the operations of FIGS. 3(*e*) to 3(*f*). That is, the identification number of the current drum stored in the memory queue 38 is deleted by the block 122. Instead, the identification number is stored in the table 31 with its associated count two hundred thousand times, i.e., the predetermined used life count, by the block 123. In this case, the routine exits via block 124 by issuing a request for a maintenance operation, such as a warning or alarm as described above. The operations in the blocks 117' through 120' between the blocks 122 and 123 are the same as those in the blocks 117 through 120 previously described. In addition, the operations in the blocks 111", 114", and 115" and that in the block 122' are the same as those in the blocks 111, 114 and 115 and that in the block 122, respectively.

The counter 44 (FIG. 1) in the embodiment being described employs a technique in which the count value in the used life count storage area with the in-use flag is read and updated by using microcode and is returned to the original storage area. The counter means 44 can be comprised of a plurality of count storage areas. Although the counter 44 of the embodiment counts synchronous pulses of the drum that are generated as the drum rotates, it is possible to arrange to count the number of printed sheets or the number of printed lines. In place of the number of uses of the drum or the printer, it is also possible to count the printing time or time required for a laser to perform scanning.

Although the invention is illustrated and described with respect to a drum, it can be applied to consumables other than a drum. If it is arranged so that consumables with different functions, such as drums and brushes identified by identification numbers or flags, can be stored in a same storage table in a memory even if each consumable has a different life.

The number or space of storage areas can be easily changed using suitable microcode.

This invention can be applied to any office machine on which the number of uses or life of consumables or replacement parts needs to be measured, particularly equipment such as printers, typewriters, or copying machines.

Although the description employs an example in which an updatable count storage area is provided for the consumables according to conventional art, other counters may be used with this invention.

What is claimed is:

1. Office equipment having consumable, exchangeably mounted parts of a predetermined useful life span, each part having an identifiable code, comprising, in combination:

memory means for storing a plurality of identification codes and a used life count value associated with each identification code;

input means for entering the identification code of a consumable loaded in the office equipment;

means for determining whether said entered identification code is the same as a stored identification code;

control means responsive to said means for determining for rewriting when required the identification codes and the used life count associated with each identification code in said memory means and for accessing the used life count value associated with said entered identification code; and counting means for counting uses to update the used life count value in accordance with time or number of uses of said office equipment and consumables, whereby the used life count value associated with the identification code of a consumable part is retained in said memory means even if said consumable part is exchanged or removed from said office equipment for subsequent use if said consumable part is again installed.

2. The apparatus claimed in claim 1 including:

means for comparing the used life count value associated with an identification code with a predetermined useful life count value for the consumable identified by the identification code; and means for indicating that the used life count value of a consumable exceeds the useful life count value.

3. Method to record the used up life of consumable, exchangeably mounted parts having a predetermined useful life span in office equipment, each part being identified by an identification code, comprising the steps of:

storing a plurality of identification codes and a used life count value associated with each identification code;

entering the identification code of a consumable loaded in the office equipment;

determining whether said entered identification code is the same as a stored identification code;

rewriting when required, according to the determining step, the identification codes and used life count associated with each identification code in said memory means;

accessing the used life count value associated with said entered identification code;

counting uses to update the used life count value in accordance with time or number of uses of said office equipment and consumables; and retaining the identification code and used life count value associated with the identification code of a consumable part in said memory means after said consumable part is exchanged or removed from said office equipment for subsequent use if said consumable part is again installed.

4. The method claimed in claim 3 including the steps of:

comparing the used life count value associated with an identification code with a predetermined useful life count value for the consumable identified by the identification code; and providing an indication that the used life count value of a consumable exceeds the useful life count value.

* * * * *